Feb. 26, 1963 F. W. STEIN 3,079,053
TEST CELL RELEASE LOADING DEVICE
Original Filed Sept. 3, 1957

INVENTOR.
Frederick W. Stein
BY
ATTORNEY.

United States Patent Office 3,079,053
Patented Feb. 26, 1963

1

3,079,053
TEST CELL RELEASE LOADING DEVICE
Frederick W. Stein, Atchison, Kans., assignor to Fred Stein Laboratories, Inc., Atchison, Kans., a corporation of Kansas
Original application Sept. 3, 1957, Ser. No. 681,742, now Patent No. 2,987,227, dated June 6, 1961. Divided and this application Dec. 21, 1959, Ser. No. 861,148
6 Claims. (Cl. 222—502)

This invention relates to release loading devices for test cells designed to determine the moisture content of various grains, seeds and other materials, and refers more particularly to such release loading devices operable to provide uniform drops of materials to be tested into the test cell.

This application is a divisional application carved out of my copending application Serial No. 681,742, filed September 3, 1957, entitled "Test Cell Release Loading Device."

An object of the invention is to provide test cell release loading devices which are of relatively simple, rugged construction, provide high precision in operation, and are operable over long periods of continued use without malfunction, breakage or loss of precision.

Another object of the invention is to provide such test cell release loading devices wherein all parts of the releasing mechanism are completely enclosed during normal use and operation, yet readily and swiftly accessible for repair or replacement.

Yet another object of the invention is to provide test cell release loading devices wherein all of the moving parts are of such construction and so designed as to encounter negligible wear over long periods despite high frequency of use.

Another object of the invention is to provide test cell release loading devices wherein the release mechanisms are operable to simultaneously drop a pair of hinged doors whereby to give a uniform repeatable drop of the material to be tested from the releasing device into a test cell positioned therebelow.

Another object of the invention is to provide test cell release loading devices wherein a pair of hinged doors are released simultaneously to drop material to be tested from the releasing device into a test cell and wherein the operator is unable to release one of the doors on actuation of the operating mechanism without releasing the other simultaneously therewith.

Still another object of the invention is to provide test cell release loading devices wherein the release mechanism automatically restores itself to a loaded or cocked position and, as well, returns the material supporting doors to a closed position upon release of the actuator of the release mechanism by the operator.

Another object of the invention is to provide test cell release loading devices wherein the material supporting doors thereof are always returned uniformly to the same level whereby charges of materials to be tested are always uniformly positioned thereabove.

Still another object of the invention is to provide test cell release loading devices wherein precision releases of materials to be tested from the devices are achieved without any precision operations, movements or actuation required by the operator other than the depression of a plunger operating the releasing mechanism, the rate or manner of depression of the plunger itself, for example, by the operator having no effect upon the proper release of the mechanism.

Another object of the invention is to provide test cell release loading devices having resilient means for cocking the releasing mechanism and returning material supporting doors in the device to the shut position wherein fatigue of said resilient means has no effect upon the proper setting of the release mechanism or its operation, so long as it will return the mechanism and doors to a certain position.

Other and further objects of the invention will appear in the course of the following description thereof.

In the drawings, which form a part of the instant invention and are to be read in conjunction therewith, embodiments of the invention are shown and, in the various views, like numerals are employed to indicate like parts.

Figure 1:
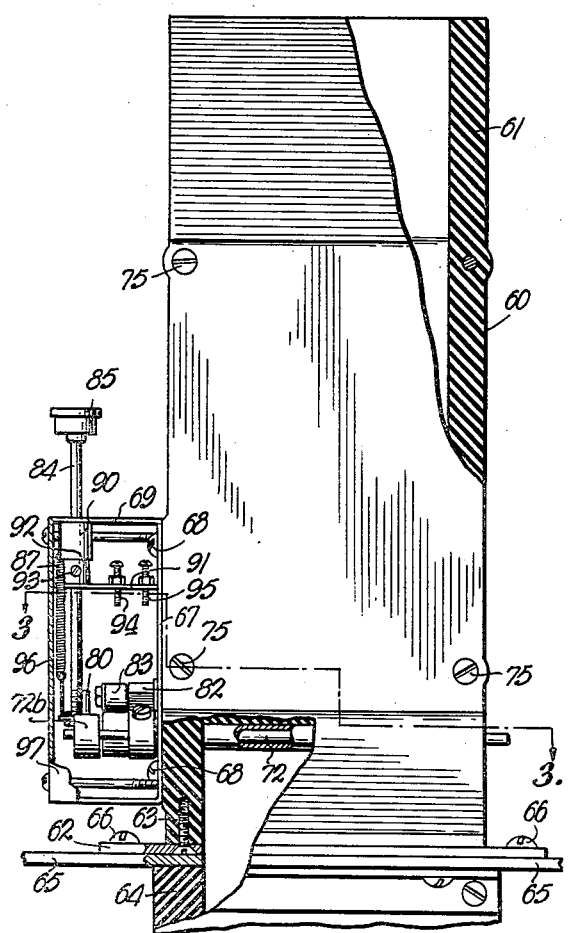
FIG. 1 is a side view of the invention with parts cut away to better illustrate the releasing mechanism in the cocked position.

Referring now to the invention shown in FIGS. 1–4, the numbering of the parts will begin at 60, which number is employed to designate a hopper throat portion of substantially uniform diameter, rectangular in vertical cross section, and having a flared enlarged upper feed portion 61. Hopper throat 60 has lower plate 62 fixed thereto by screws 63, plate 62 fixable to a typical test cell 64, having an upper flange 65 to receive flange 62, by screws 66. Mounting plate 67 is fixed to the side wall of hopper throat 60 by screws 68 and has outwardly extending upper and lower flange portions 69 and 70.

Figure 3:
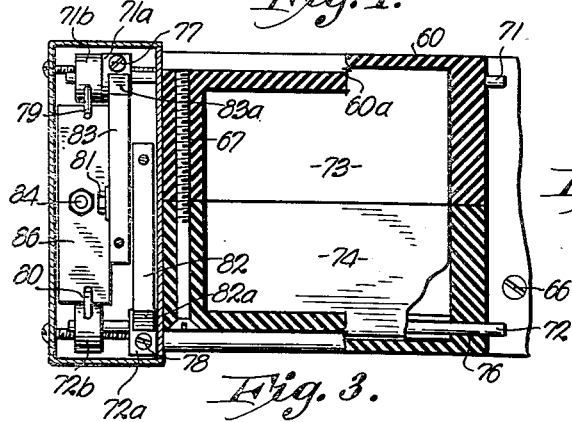
FIG. 3 is a view taken along the lines 3—3 of FIG. 1 in the direction of the arrows.
Figure 4:
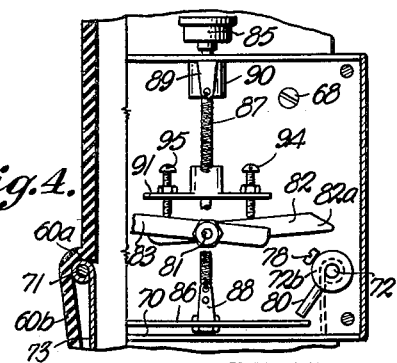
FIG. 4 is a fragmentary frontal view, partly in section, similar to that of FIG. 2, but showing the releasing mechanism in the fired position before return to the cocked position.

Referring primarily to FIG. 4, but also to FIG. 3, the throat portion 60 of the housing is recessed outwardly in the lower portion thereof as at 60a, on each side of the housing, whereby to receive first and second rotatable shafts 71 and 72 out of the direct line of the passage and then faired back inwardly as at 60b. A pair of first and second doors 73 and 74 are fixed to shafts 71 and 72 and rotate therewith. Doors 73 and 74 are so constructed as to fall vertically in line with the inside surface of the throat portion 60 of the hopper when open, as in FIG. 4 and are so formed as to close off the rectangular throat passage when they are in closed position as in FIG. 3. The hopper itself may be made in sections joined together by screws 75.

Shafts 71 and 72 are rotatably socketed in openings 76 extending through the walls of the hopper 60, and each shaft has a pair of cylindrical blocks 71a, 71b, 72a and 72b fixedly mounted on one end thereof by set screws to rotate therewith. Blocks 71a and 72a, nearest the housing, have headed set screws 77 and 78 (first radially extending means) threaded therein, while blocks 71b and 72b have posts 79 and 80 (second radially extending means) fixed thereinto. A shaft 81 having an enlarged head is fixed to mounting plate 67 and housing throat portion 60 and extends outwardly therefrom. A pair of catch arms 82 and 83 forming catch means are rotatably mounted on shaft 81 and have each a beveled end 82a and 83a. Blocks 71a and 72a are positioned on shafts 71 and 72 so that the beveled ends of arms 82 and 83 are opposite the set screw heads 78 and 77, respectively.

Plunger shaft 84 having cap 85 fixed to the top end thereof extends slidably through an opening in the upper mounting plate 69. Shaft 84 has return means or flange plate 86 fixed to the lower end thereof. Plate 86 is symmetrically mounted on the shaft 84 and has a width slightly less than the distance between cylindrical blocks 71b and 72b. Resilient spring 87 connects to flange 88 fixed to plate 86 and, at its other end, to flange 89 fixed to upper mounting plate 69. Bushing 90 provides for smooth upward and downward movement of shaft 84 relative plate 69. Bushing 90 is fixed to plate 69 and does not move with shaft 84, shaft 84 passing through a passage (not shown) extending therethrough. Thus, spring 87 tends to maintain the shaft 84 always in its uppermost position, shown in FIGS. 1 and 2. Actuating plate 91 is attached to bushing 92, the latter fixed on shaft 84 by set screw 93, and has adjustable screws 94 and 95 threaded therethrough and so position thereon as to contact the ends of arms 82 and 83 (as disengaging means therefor) opposite the beveled portions 82a and 83a. Depression of plunger shaft 84 causes the ends of screws 94 and 95 to rotate arms 82 and 83 around their pivotal mounting 81. Nuts 96 and 97 operate to fix the relative positions of screws 94 and 95 relative plate 91. Plate 91 is spaced upwardly from plate 86 a distance to be described.

Figure 2:
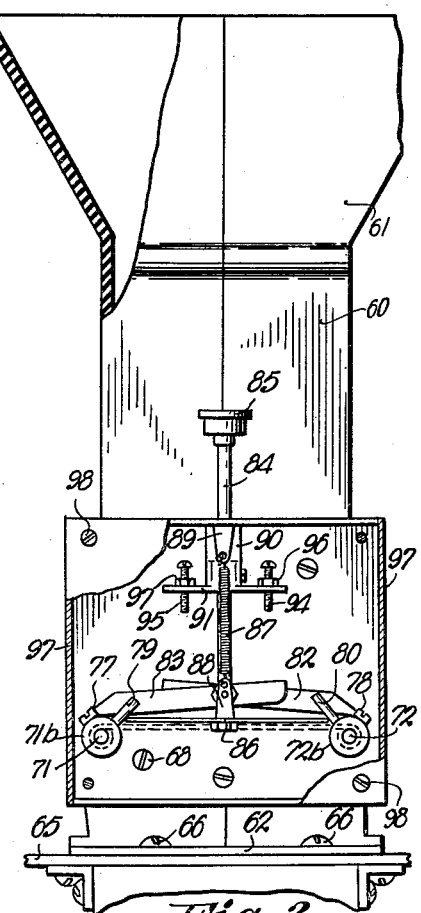
FIG. 2 is a front view of the test cell releasing device of FIG. 1, the release mechanism shown in the position of FIG. 1, with parts cut away to better illustrate the construction of the apparatus.

The operation of the releasing device shown in FIGS. 1–4 will now be described, starting from the "cocked" position of FIGS. 1–3. In this position, doors 73 and 74 close off the passage of the housing throat 60 and are at right angles to the axis thereof. Doors 73 and 74, to open to the position of FIG. 4, only rotate 90° from the position of FIG. 3. Thus shafts 71 and 72 also rotate only 90°. As the walls 60b of housing 60 are tapered below the recess 60a, the lower ends of the doors, when open, will rest thereagainst, the doors themselves hanging vertically. Spring 87 maintains shaft 84 in its uppermost position with bushing 92 abutting the underside of bushing 90 to limit the upward motion. Screws 94 and 95 are free of the ends of arms 82 and 83. Beveled ends 82a and 83a of arms 82 and 83 abut the side faces of the heads of set screws 77 and 78 whereby to lock shafts 71 and 72 against rotation, even if plunger 84 should be partly depressed. Plate 86 abuts the underside of pins 79 and 80.

To release doors 73 and 74 to permit them to fall downwardly of their own weight, thus rotating shafts 71 and 72, plunger shaft 84 is depressed by exerting force upon cap 85. Plate 86 can be depressed downwardly without releasing shafts 71 and 72 for rotation, at least until the bottom portions of the screws 94 and 95 abut the ends of the arms 82 and 83. Since doors 73 and 74 are to rotate 90°, it is desirable that the distance between plate 86 and the bottom ends of the screws 94 be sufficient that the plate 86 itself will be below the limit of fall of the pins 79 and 80 in their 90° rotation when the screws abut the arms. When such is the case, once shafts 71 and 72 are released, their rotation will not be stopped until the full 90° swing of the doors has taken place. As shaft 84 is further depressed, the ends of the screws 94 and 95 abut the ends of the arms 82 and 83 thus pivoting them about shaft 81. The beveled ends 82a and 83a of the arms 82 and 83 are raised and clear the heads of set screws 77 and 78. The weights of the doors then rotate shafts 71 and 72 as the doors fall to the position shown in FIG. 3. Any material to be tested above the doors is permitted to fall by this motion. Pins 79 and 80 and set screws 77 and 78 rotate to the position shown in FIG. 4 with the pins 79 and 80 either resting upon or immediately above the plate 86 at the latter's lowermost depressed position.

To return the mechanism to the cocked position from the fired position of FIG. 4, pressure is merely released slightly on the cap 85 to permit spring 87 to return shaft 84 upwardly. As the shaft moves upwardly, so does plate 86 therewith, thus carrying pins 79 and 80 therewith and rotating the shafts 71 and 72 attached to the cylindrical blocks 71b and 72b. As blocks 72a and 71a rotate, set screw heads 77 and 78 pass under arms 82 and 83 and, as plate 86 reaches its uppermost position of FIG. 2, beveled ends 82a and 83a fall past the side faces of the set screws to again lock them in the cocked position.

Front and side coverage of the operating mechanism is provided by outer face 96 having side faces 97 which may be abutted against upper and lower flanges 69 and 70 and screwed into place by screws 98. This arrangement provides easy access to the release mechanism for repair or replacement of the parts, if necessary.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth is to be interpreted as illustrative and not in a limiting sense.

Having thus described my invention, I claim:

1. A releasing device for testing mechanisms comprising a hopper having at least two substantially opposed sides defining a vertically extending hopper throat therebetween, a first and a second shaft mounted within and extending across the hopper throat, each of said shafts closely adjacent one of said substantially opposed sides and rotatably mounted relative thereto, a first and a second door pivotally mounted on said first and second shafts, respectively, said doors so formed as to at least substantially close off the throat of the hopper when positioned normal to the axis thereof, first radially extending means on each of said first and second shafts outside of said hopper throat for engagement with catch arms when each door is in position to close off the hopper throat, said catch arms comprising a pair of pivotally mounted arms on the outside of said hopper throat operable to engage said first radially extending means when said doors are in position to close off the hopper throat, second radially extending means on each of said shafts outside of said hopper throat for engagement by means to return the doors to the closed position to permit reengagement of the first radially extending means by said catch arms, an actuating shaft mounted outside of said hopper and vertically movable relative thereto, disengaging means on the said actuating shaft for disengaging said catch arms to permit the doors to fall open and return means on said actuating shaft adapted to engage said second radially extending means to return the doors to the closed position to permit reengagement of the first radially extending means and catch arms.

2. Apparatus as in claim 1 including resilient means connected to said actuating shaft operable to tend to retain it in a position causing the hopper doors to be in throat closing position.

3. Apparatus as in claim 1 wherein said first radially extending means include a cam surface fixed circumferentially to each of said shafts on which the catch arms rest when engaging said first radially extending means.

4. Apparatus as in claim 1 wherein the first means on the actuating shaft includes separately adjustable members for engaging each of the pair of catch arms.

5. A device as in claim 1 wherein the second means on said actuating shaft comprises a flange plate at all times underlying the said second radially extending means.

6. A device as in claim 1 wherein said substantially opposed sides are recessed to receive said first and second shafts whereby, when the said doors are open and extending vertically downward, the inwardly facing surfaces thereof continue the inner surfaces of the walls thereabove.

References Cited in the file of this patent

UNITED STATES PATENTS

| | | |
|---|---|---|
| 2,069,698 | Dempster | Feb. 2, 1937 |
| 2,956,832 | Morin | Oct. 18, 1960 |

FOREIGN PATENTS

| | | |
|---|---|---|
| 562,993 | Germany | Oct. 31, 1932 |